US006787082B1

(12) United States Patent
Fukuyama et al.

(10) Patent No.: US 6,787,082 B1
(45) Date of Patent: Sep. 7, 2004

(54) COMPRESSING MALLET WITH COATING TREATMENT

(75) Inventors: Hikaru Fukuyama, Ikeda (JP); Hiroshi Fukada, Toyonaka (JP); Tetsuro Tabata, Suita (JP); Etsuji Nakamura, Osaka (JP); Norio Kameoka, Ibaraki (JP); Toshihiro Shimizu, Itami (JP)

(73) Assignee: Takeda Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/890,021

(22) PCT Filed: Jan. 27, 2000

(86) PCT No.: PCT/JP00/00450

§ 371 (c)(1), (2), (4) Date: Oct. 10, 2001

(87) PCT Pub. No.: WO00/44554

PCT Pub. Date: Aug. 3, 2000

(30) Foreign Application Priority Data

Jan. 29, 1999 (JP) .......................................... 11-020894
Jul. 1, 1999 (JP) .......................................... 11-188242

(51) Int. Cl.$^{7}$ .......................... B29C 43/04; B29C 43/08

(52) U.S. Cl. ....................... 264/109; 264/123; 425/344; 425/345; 425/352; 425/353; 425/469

(58) Field of Search ................................ 264/109, 123; 425/344, 345, 352, 353, 469

(56) References Cited

U.S. PATENT DOCUMENTS 5,795,909 A * 8/1998 Shashoua et al. ........... 514/449
5,834,463 A * 11/1998 Ohkawa et al. ............. 514/220
5,843,955 A * 12/1998 Tamaoki et al. ............ 514/292
5,852,039 A * 12/1998 Sohda et al. ................ 514/311
5,952,356 A * 9/1999 Ikeda et al. ................. 514/340

FOREIGN PATENT DOCUMENTS

| | | |
|---|---|---|
| JP | 64-27798 | 1/1989 |
| JP | 2-104496 | 4/1990 |
| JP | 8-192295 | 7/1996 |
| JP | 11-158571 | 6/1999 |

OTHER PUBLICATIONS

Microfilm of Japanese Utility Model Application No. 42240/1989 (Laid–open No. 133294/1990), (Kabushiki Kaisha Kikusui Seisakusho), Nov. 6, 1990, Claim of Japanese Utility Model.

M. Hitomi, "Hard Chromium Treatment Technology by the Sputtering Process/Characteristics and Effects of Chrome Dope–N", Kata Gijutsu, vol. 8, No. 5, Apr. 1993, pp. 70–78 with its English translation.

A. Aubert et al., "Hard Chrome and Molybdenum Coatings Produced by Physical Vapour Deposition", Thin Solid Films, 126, pp. 61–67, 1985.

A. Aubert et al., "Hard Chrome Coatings Deposited by Physical Vapour Deposition", Thin Solid Films, 108, pp. 165–172, 1983.

* cited by examiner

*Primary Examiner*—Mary Lynn Theisen
(74) *Attorney, Agent, or Firm*—Wenderoth, Lind & Ponack, L.L.P.

(57) ABSTRACT

The punch coated with Cr-Dopé-N is advantageous as a punch for preparing tablets containing an acidic substance or an adhesive substance and is excellent in corrosion resistance and releasing property.

14 Claims, 1 Drawing Sheet

COMPRESSING MALLET WITH COATING TREATMENT

This application is a U.S. national stage of International Application No PCT/JP00/00450 filed Jan. 27, 2000.

TECHNICAL FIELD

The present invention relates to a punch, which is used for the preparation of tablets containing an acidic substance, for example, an acidic pharmacologically active substance, an acidic excipient or the like, and which is excellent in corrosion resistance and in releasing property. In addition, the present invention relates to a punch, which is used in the preparation of tablets containing an adhesive substance, for example, an adhesive pharmacologically active substance, an adhesive excipient (for example, a sugar alcohol) or the like, and which has a favorable releasing property.

Moreover, the present invention relates to a tablet machine equipped with such a punch, a process for preparation of tablets using said tablet machine and tablets prepared by said process for preparation.

BACKGROUND ART

Common tablets are prepared by compressing powders to form tablets by the us e of punches and dies provided in a tablet machine. Briefly, the machine is constituted as follows: die bore is perforated in dies provided in a die table; height of lower punches provided at lower side in the die bore is adjusted so that respective spaces in the holes have a predetermined volume; powders for tablet including powdery pharmaceuticals or the like are filled in the die bore; the powders are compressed with upper punches to form tablets; and the tablets are pushed upward by the lower punches to eject the tablets from the die bore.

The above-described punches should not be deformed easily, and a high mechanical strength is required for punches. Therefore, they have been conventionally made of super steel alloy or alloy tool steel. In addition, punches having chrome plating layer or the like on the punch surface are also used as a measure against corrosion.

DISCLOSURE OF THE INVENTION

The conventional punches made of alloy tool steel or the like as described above have a problem that a metal material or basis metal of punches has a corrosion-susceptible nature in principle, and particularly when the powders for compressing to form tablets contain an acidic substance such as an acidic drug or the like, the above metal material is more easily corroded by compressing such powders and corrosion can commence even during the compressing of powders to form tablets.

When the corrosion occurs on the punches, the slippage between the tablets prepared and die bore is not smooth and releasing property for powders become inferior, so that pushing out of the prepared tablets from die bore becomes difficult and there is a possibility that foreign materials formed by the above-described corrosion are mixed in tablets.

In addition, when the releasing property between the powders and the punch surface is inferior, problems arise that the powders for compressing tablet adhere on the punch surface so that the compressed tablet surface becomes roughened, a clear carved mark or indication cannot be formed on the tablet surface and so on.

The invention has a technical object that the above problems are solved and, particularly, that a punch is provided which is suitable for a tablet machine for molding tablets of pharmaceuticals containing an acidic substance such as an acidic drug or the like, and has excellent corrosion resistance and releasing property.

In addition, in the conventional punches using an alloy tool steel described above, a metal material has in principle a property that the powders for compressing to form tablets adhere on its surface, and particularly when the powders for compression contain an adhesive substance, for example, an adhesive pharmacologically active substance or an adhesive excipient (such as sugar alcohols) or the like, the adherence to the above-described metal material is more liable to proceed upon compressing. When such an adhesion generates, the releasing property between the powders for compressing tablet and the punch surface becomes inferior and problems arise that the compressed tablet surface becomes roughened, a clear carved mark cannot be formed on the tablets surface and so on.

The invention has a technical object that the above problems are solved and, particularly, it is an object of the present invention to provide a punch for preparing tablets, which is suitable for a tablet machine for molding or preparing tablets with a pharmaceutical preparation containing an adhesive substance for example, an adhesive pharmacologically active substance, an adhesive excipient (such as sugar alcohols) or the like, and has an excellent releasing property.

As the result of intensive researches conducted in order to solve the above-described problems, the present inventors have obtained an unexpectedly found that a punch having a coating with Cr-Dopé-N on the surface of a basis metal (for example, an alloy tool steel) has excellent corrosion resistance and releasing property. The invention has been completed upon such and further researches.

Therefore, the invention provides:

[1] A punch for compressing powders to prepare tablets, which is characterized in that the surface of the punch is coated with Cr-Dopé-N.

[2] A punch for compressing powders to prepare tablets, which is characterized in that the surface of the punch is coated for corrosion resistance with Cr-Dopé-N.

[3] A punch for compressing powders to prepare tablets, which is characterized in that the surface of the punch is coated for release with Cr-Dopé-N.

[4] A punch for compressing powders to prepare tablets, which is characterized in that the surface of the punch is coated for anti-adhesion with Cr-Dopé-N coating on the surface.

[5] The punch according to above [1], wherein the punch is applied to a punch (4 or 6) for use in a tablet machine (1) for preparing tablets containing an acidic substance or an adhesive substance.

[6] The punch according to above [5], wherein the acidic substance is Pioglitazone hydrochloride.

[7] The punch according to above [5], wherein the adhesive substance is a sugar alcohol.

[8] The punch according to above [7], wherein the sugar alcohol is D-mannitol.

[9] A tablet machine having a punch of which surface is coated with Cr-Dopé-N.

[10] A process for preparation of tablets which comprises using a tablet machine according to above [9].

[11] The process according to above [10], wherein tablets contain an acidic substance or an adhesive substance.

[12] The process according to above [11], wherein the acidic substance is Pioglitazone hydrochloride.

[13] Tablets containing Pioglitazone hydrochloride prepared by the process according to above [12].

[14] The process according to above [11], wherein the adhesive substance is a sugar alcohol.

[15] The process according to above [14], wherein the sugar alcohol is D-mannitol.

[16] Tablets containing D-mannitol prepared by the process according to above [15].

The basis metal or basis material used as a material before coating of the punch for preparing tablets of the invention may be any one that can be used as the material for punches for preparing tablets in the conventional technique. Specifically, the basis material may be any one that is not easily deformed under frequently repeated compressing procedure and has a high mechanical strength, for example, super steel alloy, carburized steel alloy or cemented carbide; alloy tool steel; sintered alloy and the like. More specifically, the material includes SKS 2, SKD, NH alloy, SUS440C and soon. The SKS2is the most preferred.

More precisely, preferred are SKS 2 prepared from an alloy tool steel containing 95% of iron, 1% of chromium, 1.5% of wolfram, 1% of carbon, 0.35% of silicon, 0.8% of manganese, 0.03% of phosphorus and 0.03% of sulfur (all percentages are weight based, and the same shall apply hereinafter), a sintered alloy characterized in that 0.2 to 5% of at least one of tantalum and niobium is added, and optionally, further 1 to 5% of iron or 1 to 3% of silicon is added, and if necessary, further 5% or less of nickel is added, to a component containing 36 to 53% of cobalt, 27 to 35% of chromium, 10to 20% of wolfram (tungsten) and 2 to 3% of carbon, and the like.

The coating of the basis metal or basis material by Cr-Dopé-N can be carried out by a method known per se, for example, the sputtering method, which is one of physical deposition techniques. More specifically, it can easily be carried out, for example, by a method described in Kata Gijutsu (Mold Technique), Vol. 8, No. 5 (April, 1993), Pages 70–78.

The tablets in the present invention encompass not only medicaments but also agricultural chemicals, fertilizers, foods, plastics, ceramics, metals and others. In many cases, these tablets contain a physiologically active substance, for example, a pharmacologically active substance in the medicament, and the pharmacologically active substance may be any one. The pharmacologically active substance is not particularly limited. Acidic substances for medicament use, for example acidic drugs, include Pioglitazone hydrochloride, Manidipine hydrochloride, Delapril hydrochloride, Fursultiamine hydrochloride, Cefotiam Hexetil hydrochloride, Thiamine hydrochloride, Hydroxyzine hydrochloride and the like. These acidic drugs can easily be manufactured by known methods.

In addition, the acidic drug in the present invention may be, for example, a mixture of an acidic drug and a neutral drug. In other words, the acidic drug may be any one insofar as it is a solid substance that exhibits acidity.

The powders for compressing tablet used in the invention include an adhesive substance. Such an adhesive substance includes adhesive pharmacologically active substances and adhesive excipients (for example, a sugar alcohol). The adhesive pharmacologically active substances include, for example, 3-[1-(phenylmethyl)piperidine-4-yl]-1-(2,3,4,5-tetrahydro-1H-1-benzazepine-8-yl)-1-propanone fumarate, Risedronate, Pioglitazone hydrochloride and the like. When an adhesive excipient is contained in the powders for compressing tablet, a pharmacologically active substance may be of non-adhesive nature. The pharmacologically active substance of non-adhesive nature that may be used in the invention includes, for example, Lansoprazole, Manidipine hydrochloride, Delapril hydrochloride, Candesartan Cilexetil, Vinpocetine, Seratrodast and the like.

Therefore, when tablets are prepared, for example, a sugar alcohol having adhesiveness to the punch is used as an excipient or a binder in the material for powders for preparing tablets by compression, in addition to the above-described pharmacologically active component.

The sugar alcohol is not limited to that for medicament use but includes sugar alcohols used in the fields of agricultural chemicals, fertilizers, foods, plastics, ceramics and metals. The sugar alcohol for medicament use specifically includes erythritol, D-mannitol, D-sorbitol, xylitol, maltitol, anhydrous maltose, hydrated maltose, anhydrous lactitol, hydrated lactitol and hydrogenated maltose starch syrup.

In addition, plural sugar alcohols can be used in combination.

As is evident from the above-listed examples (for example, Pioglitazone hydrochloride), a substance having both properties of an acidic substance and simultaneously an adhesive substance can be conveniently used in the invention.

The tablet produced by the compression may be any one insofar as it has a shape of so-called tablet, and needless to say, the tablets may be fine granules or pellets containing a drug.

When such tablets are prepared, usually as follows. The above-described pharmacologically active component (drug) is mixed optionally with an excipient, lubricant, disintegrator and the like to give powders for preparing tablets. The powders are then compressed by a punch and a die to form tablets. In the present invention, usually, for example, a sugar alcohol or an adhesive drug is contained in the powders for compressing powders to form tablets. The tablets prepared in such a manner may be further surface-coated according to a usual known method to give a coated tablets. If desired, formulation additives such as a preservative, an antioxidant, a colorant, a sweetener, a perfume, a flavor and the like can be contained in the powders for producing tablets.

Suitable examples of the excipient includes, for example, sugars such as lactose, sucrose and the like; sugar alcohols such as D-mannitol, D-sorbitol and the like; starch (for example, corn starch, potato starch, wheat starch and the like); pregelatinized starch; dextrin, microcrystalline cellulose; low-substituted hydroxypropyl cellulose; carboxymethylcellulose sodium; acacia; pullulan; light anhydrous silicic acid; synthetic aluminum silicate; carboxymethylcellulose calcium; magnesium aluminometasilicate and the like.

Suitable examples of the lubricant include, for example, magnesium stearate, calcium stearate, talc, colloidal silica and the like.

Suitable examples of the binder include, for example, starch, pregelatinized starch, sucrose, gelatin, acacia, methylcellulose, carboxymethylcellulose, carboxymethylcellulose sodium, microcrystalline cellulose, D-mannitol, trehalose, dextrin, pullulan, hydroxypropylcellulose, hydroxypropylmethylcellulose, polyvinylpyrrolidone and the like.

Suitable examples of the disintegrator include, for example, starch, pregelatinized starch, carboxymethylcellulose, carboxymethylcellulose calcium, croscarmellose sodium, carboxymethylstarch sodium, crospovidone, light anhydrous silicic acid, low-substituted hydroxypropyl cellulose and the like.

Materials for coating tablets include, for example, hydroxypropylmethylcellulose, ethylcellulose, hydroxymethylcellulose, hydroxypropylcellulose, polyoxyethyleneglycol, Tween 80, Pluronic F68, castor oil, cellulose acetate phthalate, hydroxymethylcellulose acetate succinate, Eudragit (manufactured by Röhm, West Germany, aminoalkylmethacrylate copolymer or methacrylic acid copolymer), carboxymethylethylcellulose, polyvinyl acetal diethylaminoacetate, waxes and talc, titanium oxide, colorant such as red iron oxide and the like.

Sour agent includes, for example, citric acid (anhydrous citric acid), tartaric acid, malic acid and the like.

Artificial sweetener includes, for example, saccharin sodium, dipotassium glycyrrhizinate, Aspartame, Stevia, Thaumatin and the like.

The perfume may be either synthetic or natural and includes, for example, lemon, lime, orange, menthol, strawberry and the like.

The colorant includes, for example, Food Dye such as Food yellow No. 5, Food Red No. 2, Food Blue No. 2 and the like, Food Lake Dyes, red iron oxide, talc, tar colors and the like.

The amount of the acidic substance such as an acidic drug, an acidic pharmaceutically effective ingredient or the like used in the powders for preparing tablets is not necessarily defined and is extensive. Specifically, it is about 0.001 to 99.5%, more preferably about 0.01 to 70% and most preferably about 0.1 to 50%.

The compression force is usually about 0.1 to 3.0 tons/punch, preferably about 0.5 to 3.0 tons/punch and more preferably about 0.8 to 1.6 ton/punch.

The inside diameter of the die is usually about 3 to 20 mm, preferably about 3 to 13 mm and more preferably about 5 to 9mm. The shape of the die may be circular or sometimes odd-shaped such as oval, oblong or others.

The amount of the sugar alcohol used in the powders for preparing tablets is not necessarily defined and is extensive. Specifically, it is about 0.001 to 99.5%, more preferably about 0.01 to 90% and most preferably about 0.1 to 90%.

BEST MODE FOR CARRYING OUT THE INVENTION

Figure 1:
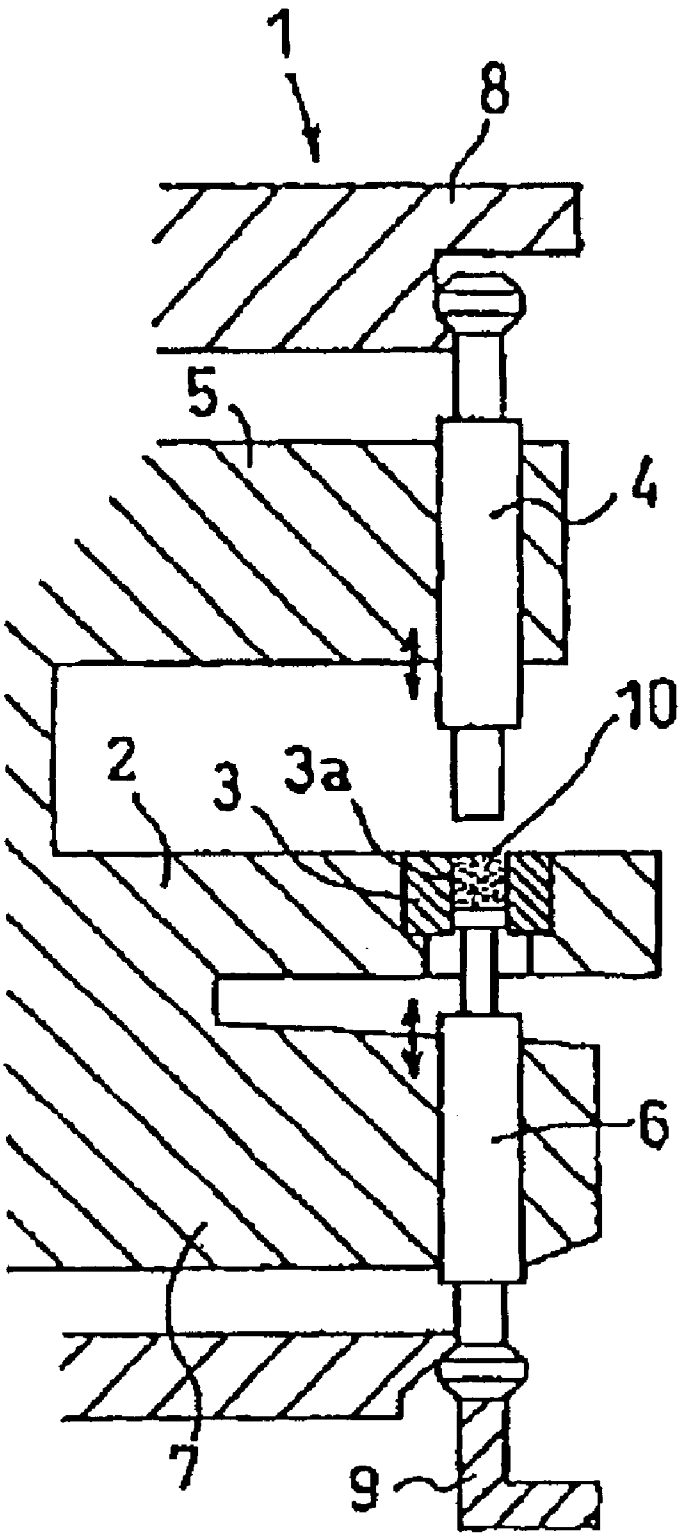
FIG. 1 shows a cross-sectional view of a rotary tablet machine with a punch according to an embodiment of the invention.

The embodiment of the invention will be described below based on the drawing.

FIG. 1 shows a cross-sectional view of a rotary tablet machine with a punch according to an embodiment of the invention. As shown in FIG. 1, plural dies are aligned in the circumferential direction with prescribed intervals in a die table (2) of a rotary tablet machine (1) and die bore (3*a*) are formed in the dies (3).

Above the die bore (3*a*), upper punches (4) are held in a supporting disk (5) for upper punches allowing movement up and down through and above the die bore (3*a*). Under the die bore (3*a*), lower punches (6) are held in a supporting disk (7) allowing movement up and down and the tops of the lower punches (6) are inserted in the die bore (3*a*) from the underside.

Above the upper punches (4), guide rails (8) for upper punches are aligned such that they contact with head portions formed on the top of the upper punches (4). On the other hand, under the lower punches (6), guide rails (9) for lower punches are aligned such that they contact with head portions formed on the bottom of the lower punches (6). The above-described die table (2), supporting disk (5) for upper punches and supporting disk (7) for lower punches are driven for coaxial rotation and the upper punches (4) and lower punches (6) are driven together with this rotation upward and downward in the prescribed position under the guidance by the both guide rails (8) and (9).

Both the above-described upper punches (4) and lower punches (6) have Cr-Dopé-N coating on an alloy tool steel.

Tablets are compressed with the above rotary tablet machine in the following procedure:

First, the lower punches (6) are positioned at a prescribed height by the guide rails (9) for lower punches so that the spaces in the die bore (3*a*) are set to have a prescribed volume. In a filling zone, powders (10) for compressing to make tablets are filled in die bore (3*a*). Then, in a compressing zone, the upper punches (4) are moved downward under the guidance of guide rails (8) for upper punches so that the powders (10) for tablets are compressed to form compressed tablets.

Thereafter, the upper punches (4) are lifted under the guidance of the guide rails (8) for upper punches, and the lower punches (6) are pushed up by the guide rails (9) for lower punches, thereby ejecting the compressed tablets from the die bore (3*a*).

In the followings, the corrosion resistance and the releasing property of the punches having Cr-Dopé-N coating as described above in the preparation of tablets containing an acidic drug and the releasing property of said punches having Cr-Dopé-N coating as described above in the preparation of tablets containing a sugar alcohol are described by comparison with the corrosion resistance and the releasing property of conventional punches made of an alloy tool steel and punches having a coating on an alloy tool steel.

EXAMPLE 1

A conventional punch made of an alloy tool steel (hereinafter, referred to as SKS 2) was treated for Cr-Dopé-N coating according to the method known per se as described above (see Kata Gijutsu (Mold technique), Vol. 8, No. 5 (April, 1993), Pages 70–78) to give a punch of the present invention (hereinafter, may be referred to as Example-punch).

The corrosion performance of the above-described punch having Cr-Dopé-N coating was compared with that of a punch made of SKS 2, a punch made of sintered alloy (hereinafter, referred to as Alloy) and punches having a coating on SKS 2. The results are shown in Table 1. The SKS 2-punch was corroded during storage (RH of 75%; room temperature; 3 days) and the corrosion was greatly accelerated by contacting with powders for compressing tablet containing 27.55% of Pioglitazone hydrochloride (obtained by mixing 33.06 parts by weight of Pioglitazone hydrochloride, 76.34 parts by weight of lactose, 3.0 parts by weight of hydroxypropylcellulose, 7.2 parts by weight of carboxymethylcellulose calcium and 0.4 part by weight of magnesium stearate). The titanium nitride-(hereinafter, referred to as TiN)-coated punch was partially corroded by contacting with the powders for compressing tablet. On the other hand, the Example-punch, the Alloy-punch, the chromium-plated punch and a chromium nitride- (hereinafter, referred to as CrN)-coated punch were not corroded at all.

The punches for comparison were as follows:

a) SKS 2-punch: A punch made of an alloy tool steel containing 95% of iron, 1% of chromium, 1.5% of wolfram, 1% of carbon, 0.35% of silicon, 0.8% of manganese, 0.03% of phosphorus and 0.03% of sulfur.

b) Alloy-punch: A punch made of a sintered alloy known as excellent in corrosion resistance (described in Japanese Patent Application No. H-09-323123).

c) Chromium-plated punch, TiN-coated punch and CrN-coated punch: Punches made by giving plating with chromium, giving a coating of TiN and giving a coating of CrN, respectively, on SKS 2 punches respectively according to known methods.

TABLE 1

| | State of Corrosion Development | | | | | |
|---|---|---|---|---|---|---|
| Storage Conditions | Example 1 punch | SKS 2 punch | Alloy punch | Chromium-plated punch | TiN-coated punch | CrN-coated punch |
| During Storage | No | Progressed | No | No | No | No |
| Upon contact with Powders for tablet | No | Great | No | No | Yes | No |

Next, the releasing property of the above-described punches was evaluated by occurrence or development of tablets without a clear carved mark on the surface (hereinafter, referred to as marking failure) during compressing due to adhesion of powders for compressing on the punch surface. The same punches as described above were compared using the powders for compressing containing 27.55% of Pioglitazone hydrochloride described above. The results were as shown in Table 2, indicating that the marking failure occurred in the chromium-plated punch, TiN-coated punch and CrN-coated punch at the initial stage. At the initial stage became discontinued because of the marking failure. The marking failure was not observed in Example-punch, SKS 2-punch and Alloy-punch at the initial and final stages.

TABLE 2

| | State of Development of Marking Failure | | | | | |
|---|---|---|---|---|---|---|
| Stage of Compressing | Example 1 punch | SKS 2 punch | Alloy punch | Chromium-plated punch | TIN-coated punch | CrN-coated punch |
| Initial Stage | No | No | No | Yes | Yes | Yes |
| Final Stage | No | No | No | Compressing discontinued | Compressing discontinued | Compressing discontinued |

From Table 1 and Table 2, it can be understood that punches satisfactory in both the corrosion resistance and releasing property were the Cr-Dopé-coated punch (Example-punch) and the Alloy-punch. However, the Alloy coating could not be applied to a punch in view of strength, because a crack formed on the top of the punch upon long term compressing.

In addition, other surface treatments such treatment as with diamond-like carbon (DLC) or with niwloy 96 were attempted on SKS 2, but a satisfactory result could not be obtained.

EXAMPLE 2

A conventional punch made of an alloy tool steel (hereinafter, referred to as SKS 2) was treated by Cr-Dopé-N coating according to the method known per se as described above (see Kata GiJutsu (Mold Technique), Vol. 8, No. 5 (April, 1993), Pages 70–78) to give a punch (hereinafter, may be referred to as Example-punch). The releasing property of Example-punch described above was compared with a punch made of SKS 2, punch made of SUS 440C and a punch coated with diamond-like carbon (DLC) on SKS 2. The releasing property of punches was evaluated by the state of development of tablets without a clear carved mark on the surface (hereinafter, referred to as marking failure) due to adhesion of powders for compressing tablet on the surface of a punch occurred during compressing, and the state of development of adhesion of powders on the surface of the punch (hereinafter, referred to as punch-adhesion defective). In carrying out the compressing in this case, a formulation of powders for tablet containing D-mannitol, shown below, was used.

| Formulation | |
|---|---|
| D-mannitol | 82 parts by weight |
| Corn starch | 14.3 parts by weight |
| HPL-C | 3.0 parts by weight |
| Magnesium stearate | 0.7 part by weight |
| | Total 100 parts by weight |

The results were as shown in Table 3, indicating that the marking failure occurred in the SKS 2-punch, SUS 440C-punch and DLC-coated punch at the initial stage. Compressing to prepare tablets was discontinued on account of the marking failure. The marking failure was not observed in Example-punch at the initial and final stages and no adhesion on the punch surface was observed.

TABLE 3

| | State of Development of Marking Failure and Adhesion Defective | | | |
|---|---|---|---|---|
| Stage of Compressing | Example punch | SKS 2 punch | SUS 440C-punch | DLC-coated punch |
| Initial Stage | No | Thin clouding | Thin clouding | Thin clouding |
| Final Stage | No | Thin clouding | Thin clouding | Thin clouding |

EXAMPLE 3

Powders for tabletting was obtained by mixing 270 parts by weight of subtilized Lansoprazole granule containing 30 parts by weight of Lansoprazole (prepared according to a method described in Japanese Patent Application No. H11-135177), 204 parts by weight of D-mannitol, 30 parts by weight of L-HPC-33, 30 parts by weight of Ceolus KG-801, 15 parts by weight of crospovidone, 3 parts by weight of anhydrous citric anhydride, 9 parts by weight of Aspartame, 3 parts by weight of Strawberry D and 6 parts by weight of magnesium stearate. Thus prepared powders were supplied to a tablet machine shown in FIG. 1 for compressing powders to prepare tablets. Materials for punches and surface treatment were the same as in Example 1. The compressing conditions included the followings: the outside diameter of prepared tablets was 7 mm φ; the weight was 180 mg/tablet; and the compressing pressure was 0.57 ton. The materials for punches, surface treatment, and the results obtained after compressing 20,000 tablets/punch were as shown in Table 4.

TABLE 4

| Material of punches and Surface treatment | Results obtained after compressing 20,000 tablets/punch |
|---|---|
| SKS 2-punch | Thin clouding |
| SUS 440C-punch | Thin clouding |
| Example-punch | No clouding |
| DLC-coated punch | Thin clouding |

Industrial Applicability

The punch for compressing tablet made of alloy tool steel treated for Cr-Dopé'-N coating according to the invention exhibits an excellent anti-corrosive property and releasing property in compressing powders to prepare tablets as a pharmaceutical preparation containing an acidic substance, has an excellent releasing property in compressing powders to produce tablets as a pharmaceutical preparation containing an adhesive substance, and provides a preparation of tablets, which is suitable for stable industrial production.

What is claimed is:

1. A punch for compressing powders to prepare tablets, which is characterized in that the surface of the punch is coated with Cr-Dopé-N.

2. A punch for compressing powders to prepare tablets, which is characterized in that the surface of the punch is coated for corrosion resistance with Cr-Dopé-N.

3. A punch for compressing powders to prepare tablets, which is characterized in that the surface of the punch is coated for release with Cr-Dopé-N.

4. A punch for compressing powders to prepare tablets, which is characterized in that the surface of the punch is coated for anti-adhesion with Cr-Dopé-N coating on the surface.

5. The punch as claimed in claim 1, wherein the punch is applied to a punch (4 or 6) for use in a tablet machine (1) for preparing tablets containing an acidic substance or an adhesive substance.

6. The punch as claimed in claim 5, wherein the acidic substance is Pioglitazone hydrochloride.

7. The punch as claimed in claim 5, wherein the adhesive substance is a sugar alcohol.

8. The punch as claimed in claim 7, wherein the sugar alcohol is D-mannitol.

9. A tablet machine having a punch of which surface is coated with Cr-Dopé-N.

10. A process for preparation of tablets which comprises using a tablet machine as claimed in claim 9.

11. The process as claimed in claim 10, wherein tablets contain an acidic substance or an adhesive substance.

12. The process as claimed in claim 11, wherein the acidic substance is Pioglitazone hydrochloride.

13. The process as claimed in claim 11, wherein the adhesive substance is a sugar alcohol.

14. The process as claimed in claim 13, wherein the sugar alcohol is D-mannitol.

* * * * *